No. 767,352. Patented August 9, 1904.

UNITED STATES PATENT OFFICE.

MITFORD C. MASSIE, OF WASHINGTON, DISTRICT OF COLUMBIA, ADMINISTRATOR OF FRITZ ACH, DECEASED, ASSIGNOR TO C. F. BOEHRINGER & SOEHNE, OF MANNHEIM-WALDHOF, GERMANY, A FIRM.

XANTHIN DERIVATIVE AND PROCESS OF MAKING SAME.

SPECIFICATION forming part of Letters Patent No. 767,352, dated August 9, 1904.

Application filed May 6, 1903. Serial No. 155,961. (Specimens.)

*To all whom it may concern:*

Be it known that FRITZ ACH, deceased, late a citizen of Germany, and a resident of Mannheim, Germany, did invent new and useful Improvements in the Preparation of Xanthin Derivatives; and I, MITFORD C. MASSIE, a citizen of the United States, and a resident of Washington, in the District of Columbia, the duly-constituted administrator of the estate of said FRITZ ACH, deceased, do hereby declare the following to be a full, clear, and exact description of the said invention of said decedent, such as will enable others skilled in the art to which it appertains to make and use the same.

The present invention relates to the preparation of xanthin derivatives, and in particular the preparation of xanthin carboxylic acids, their salts, and esters.

In application Serial No. 142,590, filed February 7, 1903, said Fritz Ach described a method of splitting off the methyl group in the position 8 in 8-methyl xanthins, said method consisting in preparing an 8-trichloromethyl xanthin and then submitting it to hydrolysis. A further study and investigation of this reaction has developed the fact that the hydrolysis of trichloromethyl xanthin proceeds in two steps or phases, carboxylic acid being formed as an intermediate product as the result of the first step, according to the equation,

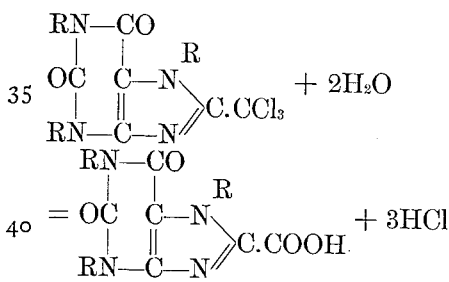

where R denotes an alkyl radical. The carboxylic acids are finally during the second phase of the reaction converted into the corresponding xanthin. Now it was further found by said inventor that these xanthin carboxylic acids, which acids, as well as their salts and ester, are of considerable importance as therapeutic agents, may be obtained as final products from trichloromethyl xanthins. The inventor found three specific methods of proceeding from these trichloromethyl xanthins to these carboxylic acids, all of which methods are generically characterized by the fact that they consist in substituting $COOR'$ or the carboxyl group $COOH$ for the group $CCl_3$ in the position 8 of the trichloromethyl xanthin. One method consists in briefly boiling the trichloromethyl compounds with water and another in heating them with a solution of an alkali salt of a weak acid—such, for example, as acetate of potassium—whereby the potassium salt of the xanthin carboxylic acid is formed. The third method devised by the inventor consists in heating the trichloromethyl compound with an alcohol, from which method the corresponding ester of the xanthin carboxylic acid results, which ester will yield the acid by saponification. By this new method of preparation the class of xanthin carboxylic acid, of which hitherto only one representative—viz., the caffein carboxylic acid—has been described, (by Gomberg in *American Chemical Journal*, Vol. XVII, page 412,) can be manufactured, and thus a number of new compounds embraced in this class are placed within the reach of the manufacturing chemist.

The present invention therefore consists generically in substituting a carboxyl group ($COOH$ or, more generically, $COOR'$ where $R'$ denotes H, a metal, or an alkyl-radical) for the trichloromethyl group ($CCl_3$) in the position 8 of an 8-trichloromethyl xanthin.

The invention also consists in such further methods, features, and steps as will be hereinafter described, and pointed out in the claims.

A detailed description of this invention as embodied in a number of examples, forming what is considered the preferred manner of carrying the same into practice, will now be given. The proportions given are all in weight unless otherwise stated.

*Example 1.—Preparation of 3-methyl xanthin carboxylic acid from 3-methyl-8-trichloromethyl xanthin by hydrolysis.*—One part of 3-methyl-8-trichloromethyl xanthin is dissolved in two hundred and forty parts of boiling water. Heat is developed, and, after cooling, 3-methyl xanthin carboxylic acid crystallizes out in the form of shining leaflets or folia. The acid may be recrystallized from about two hundred and fifty parts of hot water at a temperature of substantially 100° centigrade, and only after a sustained boiling of such solution will carbonic acid be split off and liberated from the same. The above crystals contain two molecules of water of crystallization, which water of crystallization is driven off with concurrent liberation of carbon dioxid if the crystals are heated to a temperature of substantially 120° centigrade. The ethyl ester of this new acid melts at 304° to 305° centigrade and the methyl ester at 270° centigrade. Both esters are soluble only with difficulty in alcohol. The new acid has the structural formula

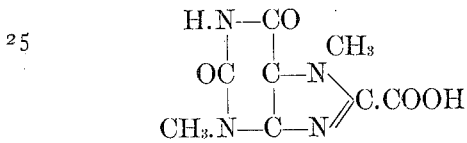

*Example 2.—Preparation of caffein carboxylic acid from 8-trichloromethyl caffein.*—Ten parts of the trichloro compound of 8-methyl caffein are boiled together with a solution of thirteen parts of acetate of potassium (corresponding to about four molecules) in one hundred and seventy parts of water. It is found that good results are obtained by adding thirty parts of alcohol to the acetate of potassium solution before boiling. After a short time (about twenty-five minutes) the trichloro compound goes into solution, whereupon the liquid is concentrated somewhat by heating on the water-bath. After cooling the potassium salt of the caffein carboxylic acid or caffein carboxylate of potassium is precipitated in the form of small snow-white acicular crystals. In order to obtain the free acid, an aqueous solution of the potassium salt is acidulated with a mineral acid, whereby the caffein carboxylic acid is thrown out. The acid so produced is identical with the compound described by Gomberg in *American Chemical Journal*, Vol. XVII, page 412, *et seq.*

*Example 3. Preparation of theobromin carboxylic acid from 8-trichloromethyl theobromin.*—Two parts of trichloro-methyl theobromin are dissolved in sixty parts of ethyl alcohol and boiled with reflux—*i. e.*, in a reflux-cooler. After about one-half of an hour the separation of the ethyl ester of the new acid begins. The boiling is thereafter continued for a further period of two and one-half hours, whereupon the whole is allowed to cool. After cooling, the ester which has been precipitated is separated by filtration. The ester is thus obtained in a perfectly pure condition. The reaction by which the ester is formed takes place according to the equation

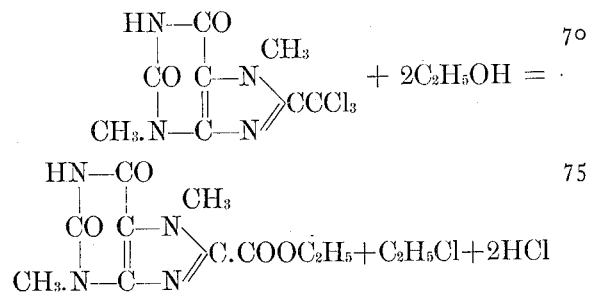

The new body, theobromin carboxylic acid ethyl ester, is soluble with difficulty in water and alcohol, about five hundred parts of boiling alcohol being needed to dissolve one part of the ester. From such a solution the ester crystallizes in the form of felted needles having a melting-point of about 300° centigrade. By saponifying with alkali the acid can be obtained from the ester, an example of such saponification being the following: One part of the ethyl ester of the theobromin carboxylic acid is introduced into four parts, by volume, of double normal potash lye (double normal solution of KHO) having the temperature of the water-bath. The ester is thus completely dissolved. The solution is then digested for a short time (two minutes) and then acidulated with acetic acid to weak-acid reaction, whereby the potassium salt of the new acid is immediately precipitated. For purifying the same it is dissolved in warm water, (100° centigrade,) of which it requires thirteen parts, and recrystallized from such solution. Under these conditions it precipitates slowly in the form of fine needles, such precipitation being rendered more complete by the addition of some alcohol, (about eight parts.) The free theobromin carboxylic acid may be obtained from an aqueous solution of this potassium salt by acidulating such solution with a mineral acid. It then crystallizes out in the form of small-pointed needle having a melting-point of 345° centigrade.

Theobromin carboxylic acid is difficultly soluble in water and almost insoluble in alcohol, chloroform, and acetic ether. Its formula is

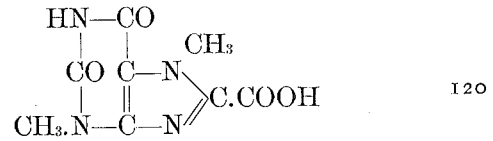

All the examples given have the fact in common that under them the 8-trichloromethyl xanthin is treated with a reagent capable of substituting a carboxyl group for the chloromethyl radical CCl₃ in the position 8.

The carboxyl group may be introduced either alone, as in Example 1 above, or combined with a metal or an alkyl radical, thus producing a salt or an ester, as in Examples 2 and 3. The methods of and reagents for the introduction of the carboxyl group, as employed in Examples 1 and 2, are the substantial equivalents of those in Example 3, as will be readily understood by those skilled in this art, and therefore the term "carboxyl group," as employed in the claims, is to be understood as covering the group COOR' generally, where R' may denote H, a metal, or an alkyl-radical.

It is also to be noted from the above examples that when an alkali salt of a xanthin carboxylic acid is to be obtained a bath, specifically a solution, of an alkali salt of a weak acid is caused to react on the corresponding trichloromethyl xanthin, and if an ester is to be obtained the corresponding trichloromethyl xanthin is heated with an alcohol or, more specifically, dissolved in an alcohol and heated until the ester is formed. The ester so formed may be converted into the corresponding alkali salt by saponifying the same in alkali-bath, preferably a solution.

What is claimed, and desired to be secured by Letters Patent of the United States, is—

1. The process of preparing an 8-xanthin carboxylic acid, which consists in reacting upon an 8-trichloromethyl xanthin with an agent which substitutes the carboxyl group for the trichloromethyl radical in trichloromethyl xanthin.

2. The process of preparing an 8-xanthin carboxylic acid which consists in heating an 8-trichloromethyl xanthin with an agent which replaces the trichloromethyl group in the trichloromethyl xanthin with a carboxyl group.

3. The process which consists in heating trichloromethyl theobromin with an alcohol.

4. The process which consists in heating trichloromethyl theobromin with ethyl alcohol.

5. The process which consists in dissolving trichloromethyl theobromin in ethyl alcohol and heating until the ethyl ester of theobromin carboxylic acid is formed.

6. The process which consists in saponifying theobromin carboxylic ethyl ester with alkali.

7. The process which consists in saponifying theobromin carboxylic ethyl ester in an alkali-bath until dissolved, and then acidifying the solution to weak-acid reaction to precipitate the corresponding alkali-salt.

8. The process which consists in saponifying theobromin carboxylic ethyl ester in an alkali-bath until dissolved, then acidifying the solution to weak-acid reaction to precipitate the corresponding alkali salt, then separating and making an aqueous solution of the alkali salt, and acidulating the solution with mineral acid, whereby the corresponding carboxylic acid is precipitated.

9. The process which consists in heating trichloromethyl theobromin with an alcohol, separating the ester thus formed, and saponifying the same with alkali.

10. The process which consists in heating trichloromethyl theobromin with an ethyl alcohol, separating the ester thus formed, and saponifying the same with alkali.

11. The process which consists in dissolving trichloromethyl theobromin in ethyl alcohol and heating until the ethyl ester of theobromin carboxylic acid is formed, separating the ester thus formed, and saponifying the same with alkali.

12. The process which consists in heating trichloromethyl theobromin with an alcohol, separating the ester thus formed, saponifying the same with alkali until dissolved and acidifying the solution to weak-acid reaction to precipitate the alkali salt of the theobromin carboxylic acid.

13. The process which consists in heating trichloromethyl theobromin with an ethyl alcohol, separating the ester thus formed, saponifying the same with alkali until dissolved, and acidifying the solution to weak-acid reaction to precipitate the alkali salt of the theobromin carboxylic acid.

14. The process which consists in dissolving trichloromethyl theobromin in ethyl alcohol and heating until the ethyl ester of theobromin carboxylic acid is formed, separating the ester thus formed, and saponifying the same with alkali.

15. The process which consists in heating trichloromethyl theobromin with an alcohol, separating the ester thus formed, saponifying the same with alkali until dissolved and acidifying the solution to weak-acid reaction to precipitate the alkali salt of the theobromin carboxylic acid, and, finally, separating and making an aqueous solution of the alkali salt and acidulating the solution with mineral acid, whereby the corresponding carboxylic acid is separated.

16. The process which consists in heating trichloromethyl theobromin with an ethyl alcohol, separating the ester thus formed, saponifying the same with alkali until dissolved, and acidifying the solution to weak-acid reaction to precipitate the alkali salt of the theobromin carboxylic acid, and, finally, separating and making an aqueous solution of the alkali salt, and acidulating the solution with mineral acid, whereby the corresponding carboxylic acid is separated.

17. The process which consists in dissolving trichlorotheobromin in ethyl alcohol and heating until the ethyl ester of theobromin carboxylic acid is formed, separating the ester thus formed, and saponifying the same with alkali, and, finally, separating and making an aqueous solution of the alkali salt and acidulating the solution with mineral acid, whereby the corresponding carboxylic acid is separated.

18. As a new chemical compound, theobromin carboxylic acid, having the structural formula hereinbefore given, which crystallizes in the form of small pointed needles having a melting-point of about 345° centigrade and which is soluble with difficulty in water and almost insoluble in alcohol, chloroform and acetic ether.

In testimony whereof I affix my signature in the presence of two witnesses.

MITFORD C. MASSIE,
*Administrator of the estate of Fritz Ach, deceased.*

Witnesses:
    HELEN M. HUTCHINGS,
    WALTER F. MCGINN.